(12) United States Patent
Steyaert

(10) Patent No.: US 9,145,023 B2
(45) Date of Patent: Sep. 29, 2015

(54) THICK, PRINTABLE LABELS SUITABLE FOR USE IN A THERMAL TRANSFER PRINTER

(71) Applicant: Brady Worldwide, Inc., Milwaukee, WI (US)

(72) Inventor: Filip M. Steyaert, Sint-Laureins (BE)

(73) Assignee: Brady Worldwide, Inc., Milwaukee, WI (US)

( * ) Notice: Subject to any disclaimer, the term of this patent is extended or adjusted under 35 U.S.C. 154(b) by 8 days.

(21) Appl. No.: 14/086,617

(22) Filed: Nov. 21, 2013

(65) Prior Publication Data

US 2014/0078236 A1 Mar. 20, 2014

Related U.S. Application Data

(62) Division of application No. 13/906,988, filed on May 31, 2013, which is a division of application No. 11/124,664, filed on May 9, 2005, now Pat. No. 8,475,914.

(51) Int. Cl.
*B32B 9/00* (2006.01)
*B32B 33/00* (2006.01)
(Continued)

(52) U.S. Cl.
CPC ............... *B41M 5/508* (2013.01); *B23B 27/00* (2013.01); *B23B 27/08* (2013.01); *B32B 5/18* (2013.01); *B32B 7/12* (2013.01); *B32B 25/08* (2013.01); *B32B 25/10* (2013.01); *B32B 27/00* (2013.01);
(Continued)

(58) Field of Classification Search
CPC .......... B41M 5/508; B41M 5/41; B41J 2/325; B41J 17/02; B32B 25/08; B32B 25/10; B32B 27/08; B32B 27/00; B32B 7/12; B32B 27/36; B32B 5/18; B32B 27/32; B32B 2307/748; B32B 2255/10; B32B 2266/0278; B32B 2250/03; B32B 2266/025; B32B 2307/75; B32B 2519/00; G09F 3/02; G09F 3/10; Y10T 428/1495; Y10T 428/28; Y10T 428/14; Y10T 428/2848
USPC ........................ 428/40.1, 41.7, 41.8; 427/466
See application file for complete search history.

(56) References Cited

U.S. PATENT DOCUMENTS 3,461,984 A 8/1969 Phillips et al.
3,565,750 A 2/1971 Evans
(Continued)

OTHER PUBLICATIONS

Derwent Abstract of DE202006019349U1, Mar. 2007, Germany.
(Continued)

*Primary Examiner* — Victor Chang
(74) *Attorney, Agent, or Firm* — Whyte Hirschboeck Dudek S.C.

(57) ABSTRACT

Thick, compressible, multilayer labels with the appearance and feel of hard plastic identification shields comprise:
A. A printable film having first and second opposing facial surfaces;
B. A first adhesive having first and second opposing facial surfaces, the first facial surface of the adhesive in intimate contact with the second facial surface of the film; and
C. Foam having first and second opposing facial surfaces, the first facial surface of the foam in intimate contact with the second facial surface of the first adhesive.
In certain embodiments of the invention, the labels include one or more of a printable coating on the first facial surface of the film, a second adhesive in intimate contact with the second facial surface of the foam, and a release liner in contact with the second adhesive.

31 Claims, 4 Drawing Sheets

(51) Int. Cl.
*B05D 1/32* (2006.01)
*B41M 5/50* (2006.01)
*B32B 5/18* (2006.01)
*B32B 7/12* (2006.01)
*B32B 25/08* (2006.01)
*B32B 25/10* (2006.01)
*B32B 27/00* (2006.01)
*B32B 27/08* (2006.01)
*B32B 27/12* (2006.01)
*B32B 27/32* (2006.01)
*B32B 27/36* (2006.01)
*G09F 3/02* (2006.01)
*G09F 3/10* (2006.01)
*B41M 5/41* (2006.01)
*B41J 2/325* (2006.01)
*B41J 17/02* (2006.01)
*B23B 27/00* (2006.01)
*B23B 27/08* (2006.01)

(52) U.S. Cl.
CPC ............... *B32B 27/08* (2013.01); *B32B 27/12* (2013.01); *B32B 27/32* (2013.01); *B32B 27/36* (2013.01); *B41J 2/325* (2013.01); *B41J 17/02* (2013.01); *B41M 5/41* (2013.01); *G09F 3/02* (2013.01); *G09F 3/10* (2013.01); *B32B 2250/03* (2013.01); *B32B 2255/10* (2013.01); *B32B 2266/025* (2013.01); *B32B 2266/0278* (2013.01); *B32B 2307/748* (2013.01); *B32B 2307/75* (2013.01); *B32B 2519/00* (2013.01); *Y10T 428/14* (2015.01); *Y10T 428/1495* (2015.01); *Y10T 428/249953* (2015.04); *Y10T 428/28* (2015.01); *Y10T 428/2848* (2015.01)

(56) References Cited

U.S. PATENT DOCUMENTS

| | | |
|---|---|---|
| 3,765,994 A | 10/1973 | Quaintance et al. |
| 4,017,350 A | 4/1977 | Thomas |
| 4,098,935 A | 7/1978 | Knudsen |
| 4,331,479 A | 5/1982 | Toyama |
| 4,480,399 A | 11/1984 | Teti, Jr. |
| 5,453,326 A | 9/1995 | Siddiqui |
| 5,762,379 A | 6/1998 | Salmon et al. |
| 5,918,989 A | 7/1999 | Stout, Jr. et al. |
| 5,951,177 A | 9/1999 | Schanke et al. |
| 6,113,293 A | 9/2000 | Schanke et al. |
| 6,630,531 B1 | 10/2003 | Khandpur et al. |
| 6,769,825 B2 | 8/2004 | Strohdiek et al. |
| 2003/0003249 A1 | 1/2003 | Benim et al. |
| 2003/0051382 A1 | 3/2003 | Sinato |
| 2004/0095244 A1* | 5/2004 | Conwell et al. ............ 340/572.8 |

OTHER PUBLICATIONS

Figures of DE202006019349U1, Mar. 2007, Germany.

* cited by examiner

THICK, PRINTABLE LABELS SUITABLE FOR USE IN A THERMAL TRANSFER PRINTER

FIELD OF THE INVENTION

This invention relates to printable labels. In one aspect, the invention relates to thick, printable labels adapted for use in thermal transfer printers while in another aspect, the invention relates to thick, printable labels useful as a replacement for engraved or plotted identification shields. In yet another aspect, the invention relates to a method of making thick, printed labels using thermal transfer printers, particularly handheld thermal transfer printers.

BACKGROUND OF THE INVENTION

In the industrial world, panel and machine builders use many push buttons and signal lights. These buttons, lights, panels, closets and the like are identified by various means. One such means is hard-plastic identification shields. These shields typically consist of a rectangular, hard-plastic plate that can be plotted, engraved or preprinted by the supplier. "Hard-plastic" means that the plate is stiff and exhibits little, if any, flexibility. The shields or plates are either self-adhesive or mechanically mounted on or about the panel, closet, button, etc. Often these shields are used in combination with a shield or plate holder.

The use of hard-plastic identification shields has a number of disadvantages. If the shields are to be kept in stock, then this can result in the creation and maintenance of a large shield inventory, especially if the shields vary in color, legend and size. If the shields are to be created as needed, then expensive and often operationally slow plotting and/or engraving equipment must be acquired and maintained (options that are often economical only for large panel applications). Outsourcing the task of creating plotted and/or engraved plates can also be expensive and time consuming.

One alternative to hard-plastic identification shields is a printable label that can be processed in standard printing equipment. Typically, the labels are attached to a carrier strip, fed into a printer, and imprinted with a legend. The labels are then removed from the carrier and attached to or about the objects requiring identification. Because of the limitations of the printers, theses labels tend to be thin and flexible and thus lack the feel and appearance of hard-plastic identification shields. However, printable labels are a well-recognized solution to the problems associated with hard-plastic identification shields, particularly with respect to cost and inventory.

One particularly useful class of printers for creating printed labels is the type that employs thermal transfer (THT) printing technology. Of these printers, hand-held THT printers are particularly desirable due to their low cost (relative to desktop printers), portability and ease-of-use. THT printing uses a heat generating print head to transfer an ink layer (typically a wax and/or other binder compounded with carbon black and/or other pigment) or the like, from a THT ribbon to a label. By using digital technology, characters are formed on a label by energizing a sequence of pixels on the print head and when the print head comes in contact with the ribbon, it softens the wax and/or other binder of the ink layer on the ribbon. At the same time that the print head is in contact with the ribbon, the ribbon is in contact with the label, and thus the character image on the print head is transferred to the label.

THT label printers use a labeling media that is fed from a media unwind simultaneously when a platen roll feeds it and an ink transfer ribbon. The labeling media and the transfer ribbon pass between the print head and the platen, driven by the rotating platen. As a result, the labeling media and the transfer ribbon pass together in overlay relationship between the print head and the platen roll. These printers and their operation are described more fully in U.S. Pat. Nos. 5,951,177, 6,113,293 and 6,769,825.

The use of thick, i.e., greater than (>) about 300 microns (:m), labeling media in many commercially available THT printers, particularly hand-held printers, is problematic at best. Most commercially available THT printers are designed to process labeling media no thicker than about 300 :m, and such labels are far removed from the hard-plastic shields in terms of appearance and feel (or heft). Accordingly, the labeling industry has a recognized need for labels that have the appearance and feel of hard-plastic identification shields but that can be printed using a THT printer, particularly a hand-held THT printer.

SUMMARY OF THE INVENTION

According to this invention, a thick, compressible, multi-layer label that is suitable for use with conventional, commercially available THT printers, particularly hand-held printers, is described. In a first embodiment of this invention, the label comprises:
  A. A printable film having first and second opposing facial surfaces;
  B. A first adhesive having first and second opposing facial surfaces, the first facial surface of the adhesive in intimate contact with the second facial surface of the film; and
  C. Foam having first and second opposing facial surfaces, the first facial surface of the foam in intimate contact with the second facial surface of the first adhesive.

In a second embodiment of the invention, the label further comprises:
  D. A coating in intimate contact with the first facial surface of the film.

In a third embodiment of the invention, the label further comprises:
  E. A second adhesive having first and second opposing facial surfaces, the first facial surface of the second adhesive in intimate contact with the second facial surface of the foam.

In a fourth embodiment of the invention, the label further comprises:
  F. A release liner having first and second opposing facial surfaces, the first facial surface of the liner in intimate contact with the second facial surface of the second adhesive.

In the first embodiment, the film comprises any material suitable for use as a substrate to receive and hold an image from a printer, e.g., a polymeric material that will receive and hold an ink layer from a transfer ribbon of a THT printer. In the second embodiment, the coating can either serve as the substrate to receive and hold the image from the printer (in which case the film can but need not comprise a material adapted for such a use), or it can serve as a protective covering for the film and/or image (in which case the film is adapted to receive and hold the image). In another variation on this combination of coating and film, the coating can serve as a substrate to receive an image from the printer and as a protective covering for the film.

In each embodiment of the invention, the label construction, i.e., the combination of the film, first adhesive and foam, and optionally the coating, second adhesive and/or release liner, is greater than about 300, typically greater than about 400, more typically greater than about 500 and even more typically greater than about 600, :m. The individual thickness of each component or layer of the label construction can vary widely, but typically the foam layer is the thickest part of the construction. The foam is sufficiently compressible such that the label construction can be fed through and a legend printed upon the film and/or printable coating in a printer, preferably a THT printer, and more preferably a THT hand-held printer.

In another embodiment the invention is label media, i.e., labels on a carrier strip that usually doubles as a release liner, on which the labels are positioned in such a manner that the media can be fed continuously through a printer, preferably a THT printer and more preferably a THT hand-held printer, without deleterious back feeding. In this embodiment, the labels are placed on the carrier strip such that the space or gap between adjacent labels on the strip is small relative to the diameter of the platen roller such that the print head is not pressed too far into the space or gap between the labels. In yet another embodiment, the invention is label media in which filler strips or the like bridge the gap (or at least enough of the gap) between adjacent labels such that the print head is not pressed into the gap.

DETAILED DESCRIPTION OF THE INVENTION

Figure 1:
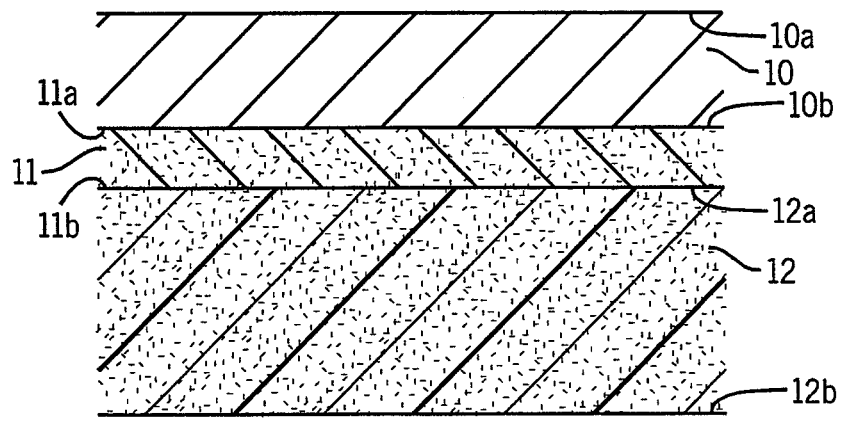
FIG. 1 is a schematic cross section of the first embodiment of the invention.

FIG. 1 is a schematic cross section of the first embodiment of the invention. The construction of this embodiment is a three-layer structure comprising a first or top layer of film 10 in intimate contact with a second or intermediate layer of first adhesive 11 that in turn is in intimate contact with third or bottom layer of foam 12. "In intimate contact" means that two facial (as opposed to edge) surfaces of the adjoining layers are in contact with one another as is a coating with its substrate. While preferably the full facial surface of one layer is in intimate contact with at least part of the adjoining facial surface of the other layer (e.g., one layer has a smaller facial surface area than the other layer), "in intimate contact" also includes those variations in which only part of one facial surface of one layer is in contact with only part of the adjoining facial surface of the other layer, e.g. the adhesive layer is a series of adhesive islands on the second facial surface of the film.

In this first embodiment, second facial surface 10b of film 10 is in intimate contact with first facial surface 11a of first adhesive 11, and second facial surface 11b of first adhesive 11 is in intimate contact with first facial surface 12a of foam 12. First facial surface 10a of film 10 is available to receive and hold an image from either a printer or other image-transferring device (not shown), or coating 13 as depicted in FIG. 2, and second facial surface 12b of foam 12 is available to intimately join with first facial surface 14a of second adhesive 14 as depicted in FIG. 3.

Figure 2:
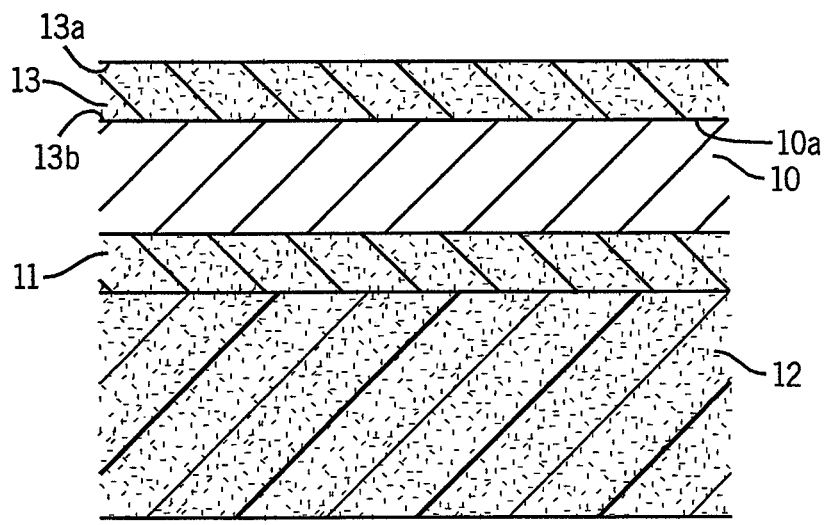
FIG. 2 is a schematic cross section of the second embodiment of the invention.

FIG. 2 is a schematic cross-section of the second embodiment of the invention. The construction of this embodiment is a four-layer structure comprising the three-layer structure of the first embodiment in combination with printable coating 13. In this embodiment, second facial surface 13b of coating 13 is in intimate contact with first facial surface 10a of film 10, coating 13 thus being the top layer of this label construction. As the top layer, first facial surface 13a of coating 13 is available to receive and hold an image from either a printer or other image-transferring device (not shown).

Figure 3:
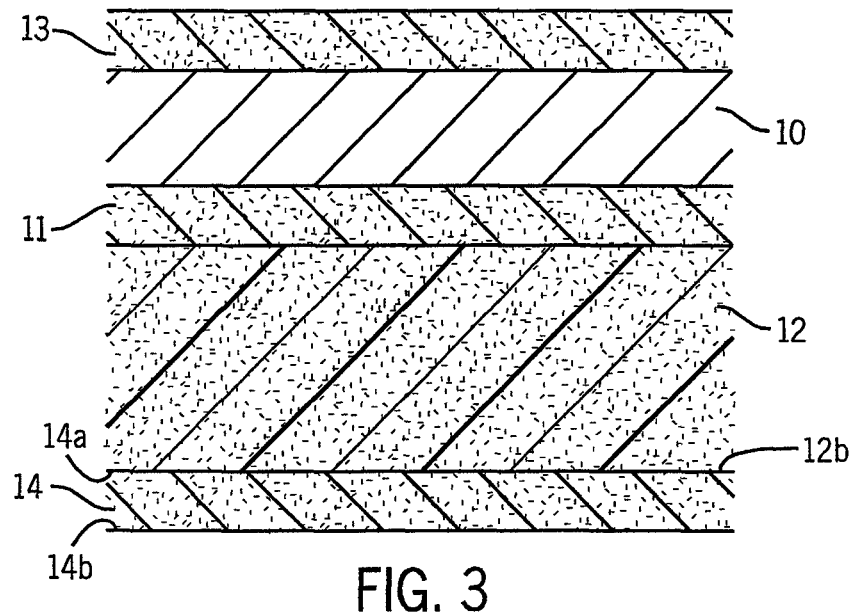
FIG. 3 is a schematic cross section of the third embodiment of the invention.

FIG. 3 is a schematic cross-section of the third embodiment of the invention. The construction of this embodiment is at least a four-layer structure comprising the three-layer construction of the first embodiment in combination with second adhesive 14, optionally in further combination with coating 13. In this embodiment, second facial surface 12b of foam 12 is in intimate contact with first facial surface 14a of second adhesive 14. If coating 13 is present as depicted in FIG. 2, then the label construction of this third embodiment comprises five layers; if the coating 13 is not present, then the label construction of this third embodiment comprises four layers. Preferably coating 13 is present in this embodiment.

Figure 4:
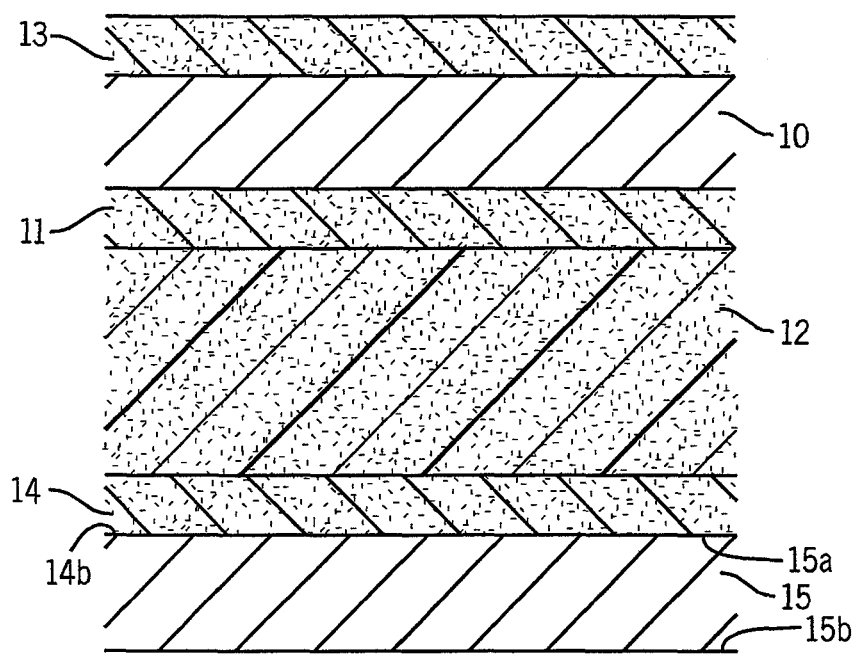
FIG. 4 is a schematic cross section of the fourth embodiment of the invention.

FIG. 4 is a schematic cross-section of the fourth embodiment of the invention. The construction of this embodiment is at least a five-layer structure comprising the three-layer construction of the first embodiment in combination with second adhesive 14 and release liner 15, optionally in further combination with coating 13. In this embodiment, second facial surface 14b of second adhesive 14 is in intimate contact with first facial surface 15a of release liner 15. If coating 13 is present as depicted in FIGS. 2 and 3, then the label construction of this fourth embodiment comprises six layers; if the coating 13 is not present, then the label construction of this fourth embodiment comprises five layers. Preferably coating 13 is present in this embodiment. Second facial surface 15b of release liner 15 is typically exposed to the environment and is constructed of such materials and in such a manner to allow the label construction of this embodiment to be formed into a roll that will exhibit little, if any, blockage upon unraveling and sufficient coefficient of friction with the platen roll to minimize slippage when driven.

The film used in the label constructions of this invention can comprise any material that will either or both receive and hold an image transferred from a printer or other image-transferring device or support a coating that can receive and hold an image transferred from a printer or other image-transferring device. Typically, the film is made from a polymeric material such as polyester (e.g., polyethylene terephthalate (PET)), polyolefin (e.g., polyethylene, polypropylene, etc.), polycarbonate and the like. The thickness of the film is typically at least about 100, preferably at least about 150 and more preferably at least about 200, :m. In one embodiment, two or more films, e.g., two or more polyester films, are heat-laminated together to produce a multilayer film of a desired thickness. Thermfilm DM/M-800, a multilayer polyester film manufactured and sold by Flexcon Company is representative of this kind of film. The film is sized and designed to provide the appearance and feel of a hard-plastic shield after application to a substrate surface.

The foam used in the label constructions of this invention can comprise any material that will compress sufficiently to allow the label to be fed through a printer or other image-transferring device, preferably a THT printer and more preferably a THT hand-held printer, and that will regain most, if not all, of its original thickness upon or shortly after exiting the printer or device. Typically the foam comprises a polymeric material, and preferably it comprises a polyethylene or polyurethane material. Polyethylene foams are particularly preferred. The thickness of the foam layer is typically at least about 200, more typically at least about 300 and most typically at least about 350, :m.

The first and second adhesives can be the same or different, as each serves a different purpose than the other. The purpose of the first adhesive is to provide a permanent bond between the film and the foam and as such, can be either a pressure sensitive adhesive or a heat-sealable adhesive. The purpose of the second adhesive is to provide a means for fixing the label once printed to a surface where it can serve as an identification marker and as such, preferably the second adhesive is a pressure-sensitive adhesive.

The adhesives that can be used in the practice of this invention can be of various types available for the intended purpose. Heat-sealable adhesives are commonly available in solution or emulsion form and can be directly coated on the underside of the film (surface 10b in FIG. 1), or the top side of the foam (surface 12a in FIG. 1), or heat laminated to either surface, or heat laminated between each surface in one process. If the heat-sealable adhesive is first coated or laminated to one surface, then the other surface is heat laminated to complete the top part of the construction. Various adhesives types can be used for this lamination including polyesters and modified synthetic elastomers.

In the case of the use of pressure-sensitive adhesives either for lamination of the film to the foam or for mounting the product (surface 12b in FIG. 3), any of the types available either as coatings by solution, emulsion, hot melt, uv-curable, etc., can be used along with pre-cast pressure-sensitive adhesives (commonly known as transfer adhesives). In the case of direct coating, the adhesive is applied to the foam surface and if required a release liner (15 in FIG. 4) is laminated to it. In the case of a transfer adhesive, the pre-cast adhesive is laminated to the foam, generally including a liner which can be used (as 15 in FIG. 4) if suitable, or removed and replaced with a more suitable liner. Pressure sensitive adhesives are compounded from various polymers including acrylic, natural and/or synthetic rubber elastomers, ethylene vinyl acetate, polyurethane, and the like.

The adhesive layer or layers is applied to the opposing sides of the foam layer in any convenient manner, e.g., spraying, dipping, roll coating, dry or heat lamination, etc. The adhesive is applied in a very thin layer(s), e.g., between about 10 and about 100, preferably between about 25 and about 75 and more preferably between about 45 and about 55, :m so as to provide a sufficiently strong bond between the foam layer and the film in one instance, and between the foam layer and a substrate surface in another instance.

Alternatively, a foam tape can be used in the construction of the label. A wide selection of foam tapes with pressure-sensitive adhesive layers pre-coated on each side is commonly available. One preferred foam tape is Duplocoll 5016, a black polyethylene foam with a tackified solvent-based acrylic pressure-sensitive adhesive coated on each side and marketed by Lohmann.

In those embodiments in which a second adhesive layer is not an integral part of the label construction, then the label must be affixed to a substrate surface by other means, e.g., applying an adhesive to a substrate surface to engage the label, use of mechanical means (e.g., holders, friction fits, etc.), and the like.

For those embodiments of the invention in which a second adhesive is an integral part of the construction of the label, then the label is typically carried on a release liner for storage and feeding through the printer. The construction of the release liner is not particularly important to the practice of this invention and its purpose, of course, is to protect the adhesive until the label is ready for application to a substrate. The thickness of the release liner is typically between about 25 and about 150, preferably between about 50 and about 150 and more preferably between about 80 and about 120, :m. Examples of materials that can be used for the liner include glassine paper, laminated paper, polyester films and polypropylene film, preferably each of which has been subject to a coating of silicone.

The composition of the coating used in the practice of this invention is also not particularly important, and it typically comprises any material that can receive and hold an image from a printer or other image-transferring device, particularly a THT printer. Typically, the coating comprises a layer made from a polymer that softens sufficiently on heat application and offers sufficient adhesion to allow for good transfer of the ink layer from the THT printer during the printing process. Generally, coatings of this type can be formulated to soften at lower temperatures for best image formation, fast printing and lower printer wear, or to soften at higher temperature to achieve a more durable, resistant image quality. Coatings for this purpose are compounded from various polymers including polyesters, polyurethanes, polyolefins, acrylates, polyvinyl chloride, vinyl acetates, and the like. These are sometimes compounded with other ingredients to supply the correct abrasion resistance, slip characteristics, solvent resistance, durability and handling through printers. The coating and film should be compatible with one another to ensure that their intimate contact results in a strong and permanent bond between them. The coating can be applied to the film in any conventional manner.

The labels of this invention are prepared in a manner similar to those labels known in the art. In one illustrative method, the film is first prepared in any conventional manner, e.g., cast or extruded, in one or more multiple layers from one or more polymeric resins, e.g., polyethylene terephthalate (PET). Many of the films used in the practice of this invention are commercially available. The film is then covered or coated (if a coating is part of the label construction) on one facial side, again in any conventional manner, with a printable coating. After the coating is dried, the film is joined to the foam layer by the first adhesive and if the foam layer contains a second adhesive on the side opposite the first adhesive, then that is applied before this 4-layer construction is joined to a release liner by means of the second adhesive layer (assuming that the label construction includes a second adhesive; if it does not, then these last two steps are eliminated).

Many variations exist on this illustrative method of preparing the label construction. For example, the two or more of the described steps can be reversed or otherwise changed in sequence, or the film and foam construction (with or without the coating) can be shaped or cut to a particular size and/or design before or after applied to a release liner (assuming that a release liner is part of the ultimate label construction), or, as noted above, a pre-constructed foam tape (with or without a release liner) can be joined to the film (with or without a coating), and the like. The final product is such that typically it can be rolled upon itself for easy shipment and storage. The final product is used in the same manner with printers or other image-transferring devices as are conventional labels, and are particularly useful with THT printers, especially hand-held THT printers.

In another embodiment of the invention, the labels, i.e., constructions without a release liner, are placed upon the release liner in such a manner as to promote smooth operation of the printer or other image-transferring device, particularly a THT printer. In these operations, the release liner also serves as a carrier strip for feeding the labels into and through the printer. The labels can be sized and shaped either before or after they are joined to the liner (usually the labels are die cut while on the liner). Due to their thickness, each label is typically separated from every other label on the strip, i.e., they do not touch or abut one another; rather a gap or space exists between adjacent labels on the strip. This arrangement allows the strip to be folded or rolled onto itself for shipment, storage and/or to follow the print track within the printer (which typically is serpentine).

As the strip carrying the labels passes through the space between the print head/transfer ribbon and the platen roll, the print head experiences considerable force away from the platen roll due to the compression of the foam. When the label clears this space, the print head has a natural tendency to recover to its normal position, and this can lead to printing problems such as either unprinted or partially printed labels or even jamming of the print head against the strip when continuing to feed either in the forward or reverse (back-feed) direction. Several methods, alone or in combination with one or more of the other methods, have been identified to avoid, or at least reduce its frequency of occurrence, this problem.

Figure 5:
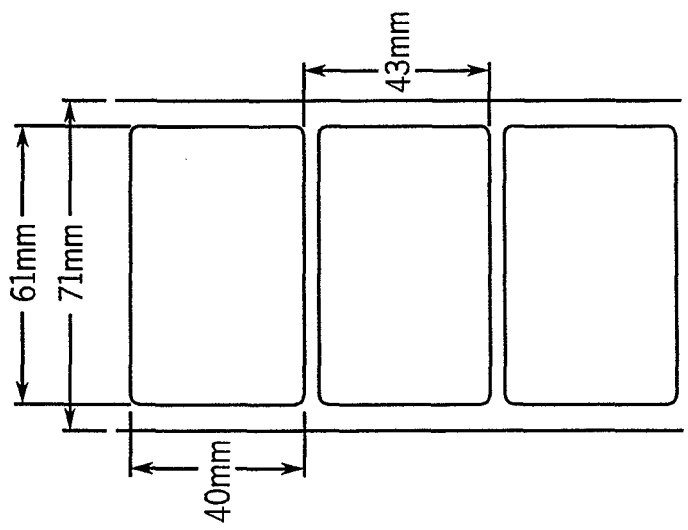
FIG. 5 is a schematic depiction of one embodiment of the label media of this invention.

One such method is spacing the labels on the release liner or carrier strip at intervals from one another so that the print head does not have the opportunity to push onto the carrier strip itself or, in other words, at least a number of labels are arranged on the strip such that the distance between adjacent labels is such that the platen roll does lose positive frictional engagement with the carrier strip and the print head does not lose contact with the printing surface of each label as one label leaves the printing station and another label enters the printing station. This spacing is a function of the thickness of the labels, the compressibility of the foam, and the diameter of the platen roller. The smaller the ratio of the diameter of the platen roller to the thickness of the label, the smaller the spacing between the labels must be to prevent printing problems. The less compressible a given thickness of the foam is, the smaller the spacing between the labels must also be to prevent jamming. FIG. 5 illustrates one embodiment of this spacing. The determination of other embodiments is within the skill of the ordinary artisan.

Figure 6:
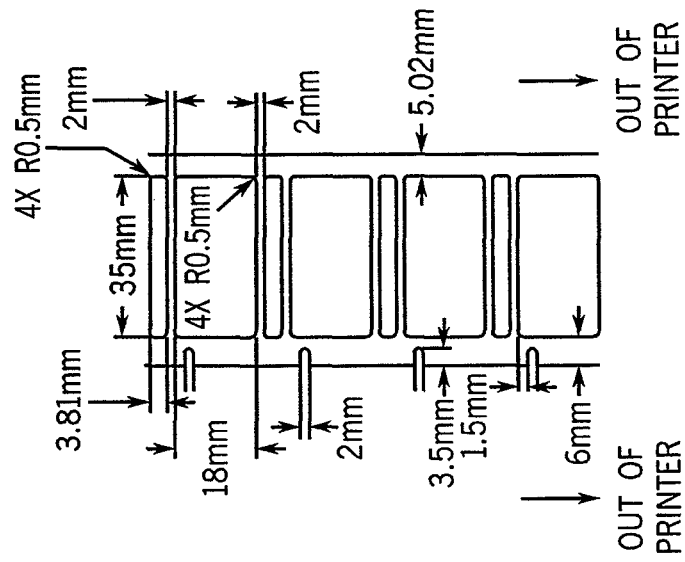
FIG. 6 is a schematic depiction of another embodiment of the label media of this invention.
Figure 7:
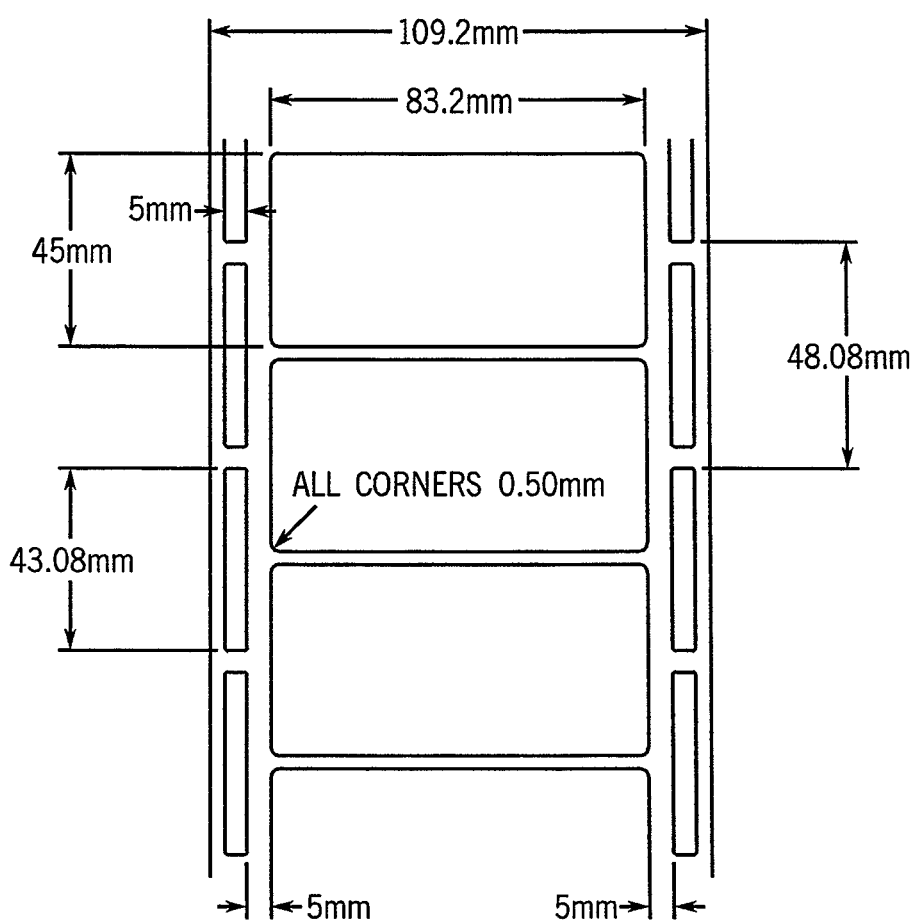
FIG. 7 is a schematic depiction of another embodiment of the label media of this invention.

Another method is to include on the carrier strip support elements of approximately the same thickness as the labels, and to place these support elements on the strip in such a manner as to prop the print head up while the carrier strip advances through the printer and positions another label for printing or, in other words, supporting elements are positioned on the strip to bridge the space formed between two non-abutting labels such that the platen roll does not lose positive frictional engagement with the carrier strip and the print head does not lose contact with the printing surface of each label as one label leaves the printing station and another label enters the printing station. These support elements are not labels, and are positioned so that they do not receive an image from the transfer ribbon. FIGS. 6 and 7 illustrate two such positions for these elements, i.e., between the labels and between the labels and the long edge of the carrier strip, respectively. The size of the carrier elements can vary, but the positioning and sizing of these elements is such to bridge the space or gap between adjacent labels on the carrier strip. Typically, the carrier elements are of the same construction of the labels, and are sized no larger than necessary as to form an effective bridge between adjacent labels.

The labels of this invention are used in the conventional manner. If carried on a release liner and including a second adhesive that is a pressure-sensitive adhesive, then after printing the label is removed from the release liner and applied with moderate pressure to a substrate surface, e.g., the face of an electrical panel or closet, such that the adhesive side of the label engages the substrate surface. If the label construction does not include a release liner and/or pressure sensitive adhesive, then after printing the label is simply affixed to the substrate surface by any convenient means, e.g., water or heat activated adhesive, insertion in a label holder, mechanical fasteners, etc. The labels of this invention are particularly useful for identifying the various buttons and lights on electrical panels and closets and once applied to the panel or closet surface, they appear and feel as hard plastic identification shields.

Although the invention has been described in considerable detail, this detail is for the purpose of illustration. Many variations and modifications can be made on the invention as described above without departing from the spirit and scope of the invention as described in the appended claims. All U.S. patents and allowed U.S. patent applications referenced above are incorporated into the specification by reference.

What is claimed is:

1. A method of printing labels in a thermal transfer (THT) printer configured for receiving and processing a labeling media having a thickness of 300 microns or less, the printer comprising a print head, transfer ribbon and platen roll;
   the method comprising:
      feeding a carrier strip comprising a plurality of labels situated thereon through the printer, at least two labels being 200 microns or greater in thickness and comprising a compressible foam material layer and a printable substrate, a bridge element situated within a space between the two labels, the bridge element sized smaller than the two labels;
      wherein, as the carrier strip is fed through the printer, the platen roll maintains positive frictional engagement with the carrier strip, and the print head contacts the transfer ribbon to imprint an image on the printable substrate of said labels.

2. The method of claim 1, wherein the foam material layer is at least 200 microns in thickness.

3. The method of claim 1, wherein the space between the two labels and the bridge element is such that, during feeding of the carrier strip through the printer, the transfer ribbon does not lose contact with the printable substrate of a label as it enters and passes through the printer.

4. The method of claim 1, wherein the bridge element is of about the same thickness as the two labels such that the print head is propped up while the carrier strip is fed through the printer.

5. The method of Claim 1, wherein the bridge element bridges the space between the two labels.

6. The method of claim 1, wherein the carrier strip further comprises a support element situated on the carrier strip between a label and a long edge of the carrier strip.

7. The method of claim 1, wherein the printable substrate of at least one of said two labels comprises a polymeric film.

8. The method of claim 7, wherein the printable substrate comprises a polymeric coating on the polymeric film.

9. The method of claim 1, wherein at least one of said two labels further comprises an adhesive material on a surface of the foam material layer.

10. The method of claim 9, wherein the at least one label further comprises a liner over said adhesive material.

11. The method of claim 1, further comprising, after feeding the carrier strip through the printer, forming the carrier strip into a roll.

12. The method of claim 1, further comprising applying an adhesive to a surface of the foam material layer and bonding the printable substrate thereto.

13. The method of claim 1, further comprising applying a coating to the printable substrate, said coating comprising a material for receiving an image from the printer thereon.

14. The method of claim 1, wherein a combined thickness of the carrier strip and one of said labels is 300 microns or greater.

15. A method of printing labels in a thermal transfer (THT) printer comprising a print head, transfer ribbon and platen roll, the method comprising:
feeding a carrier strip comprising a plurality of labels situated thereon through the printer, at least two labels comprising a compressible foam material layer and a printable substrate and situated on the carrier strip in a non-abutting arrangement with a gap therebetween, and a bridge element situated within the gap between the two labels, the bridge element sized smaller than the two labels;
wherein, as the carrier strip is fed through the printer, the platen roll maintains positive frictional engagement with the carrier strip, and the print head contacts the transfer ribbon to imprint an image on the printable substrate of said labels.

16. A method of printing labels in a thermal transfer (THT) printer comprising a print head, transfer ribbon and platen roll, the method comprising:
imprinting an image on a label situated on a carrier strip comprising a plurality of labels, by contact of the print head with the transfer ribbon on a surface of the label, and positive frictional engagement of the platen roller with the carrier strip;
the labels comprising a compressible foam material layer and a printable substrate, and at least two labels situated on the carrier strip in a non-abutting arrangement with a gap therebetween, and a bridge element situated within the gap between the two labels, the bridge element sized smaller than the two labels.

17. The method of claim 16, wherein the carrier strip further comprises a support element situated on the carrier strip between a label and a long edge of the carrier strip.

18. A method of printing labels in a thermal transfer (TUT) printer comprising a print head, transfer ribbon and platen roll, the method comprising:
imprinting an image on a label situated on a carrier strip by contact of the print head with the transfer ribbon on a surface of the label and positive frictional engagement of the platen roller with the carrier strip;
the carrier strip comprising a plurality of spaced apart labels removably situated thereon and comprising a printable substrate and a compressible foam component, at least two labels spaced apart by a gap; and
a bridge element situated within the gap between the two labels in a non-abutting arrangement such that the print head of the printer is supported by the bridge element when the carrier strip is fed through the THT printer, the bridge element sized smaller than said two labels.

19. The method of claim 18, wherein the bridge element has substantially the same construction as said two labels except for one or more layers or components.

20. The method of claim 18, wherein the bridge element has a width different than said two sequential labels.

21. The method of claim 18, wherein the bridge element is about the same thickness as said two labels.

22. The method of claim 18, wherein the method comprises printing the labels with said image but not the bridge element.

23. The method of claim 18 wherein the bridge element has a printable surface.

24. The method of claim 18, wherein the bridge element bridges the gap between said two labels.

25. The method of claim 18, wherein the carrier strip further comprises a support element situated on the carrier strip between a label and a long edge of the carrier strip.

26. The method of claim 18, wherein the printable substrate of one or more labels is adhesively attached to the compressible foam material.

27. The method of claim 18, wherein the printable substrate of one or more labels comprises multiple layers.

28. A method of printing labels in a thermal transfer (THT) printer comprising a print head, transfer ribbon and platen roll, the method comprising:
imprinting an image on a label situated on a carrier strip by contact of the print head with the transfer ribbon on a surface of the label and positive frictional engagement of the platen roller with the carrier strip;
the carrier strip comprising a plurality of labels removably situated thereon, at least two labels comprising a printable substrate and a compressible foam material, and a bridge element situated between and separated from the two labels,
the bridge element sized smaller than said two labels.

29. The method of claim 28, wherein the printable substrate of said label is imprinted with said image on, but the bridge element is not imprinted with said image.

30. A method of printing labels in a thermal transfer (THT) printer comprising a print head, transfer ribbon and platen roll, the method comprising:
imprinting an image on a label situated on a carrier strip by contact of the print head with the transfer ribbon on a surface of the label and positive frictional engagement of the platen roller with the carrier strip;
the carrier strip comprising a plurality of labels removably situated thereon, at least one label comprising a printable substrate and a compressible foam component; and
a support element situated between at least one label and a long edge of the carrier strip and a bridge element situated within a gap between two of the labels, the bridge element sized smaller than the two labels.

31. A method of printing labels in a thermal transfer (TI-IT) printer comprising a print head, transfer ribbon and platen roll, the method comprising:
feeding a carrier strip comprising a plurality of labels situated thereon through the TUT printer, at least two labels comprising a compressible foam material layer and a printable substrate and spaced apart by a gap, a bridge element situated within the gap between the two labels in a non-abutting arrangement, the bridge element sized smaller than the two labels; and
printing an image on a label situated on the printable substrate of the labels but not the bridge element by contact of the print head with the transfer ribbon on the printable substrate of the label;
wherein the print head of the printer is supported by the bridge element.

* * * * *